March 6, 1928.
C. W. CUNDIFF
1,661,927
DITCHING AND GRADING MACHINERY
Filed Aug. 31, 1923
2 Sheets-Sheet 1
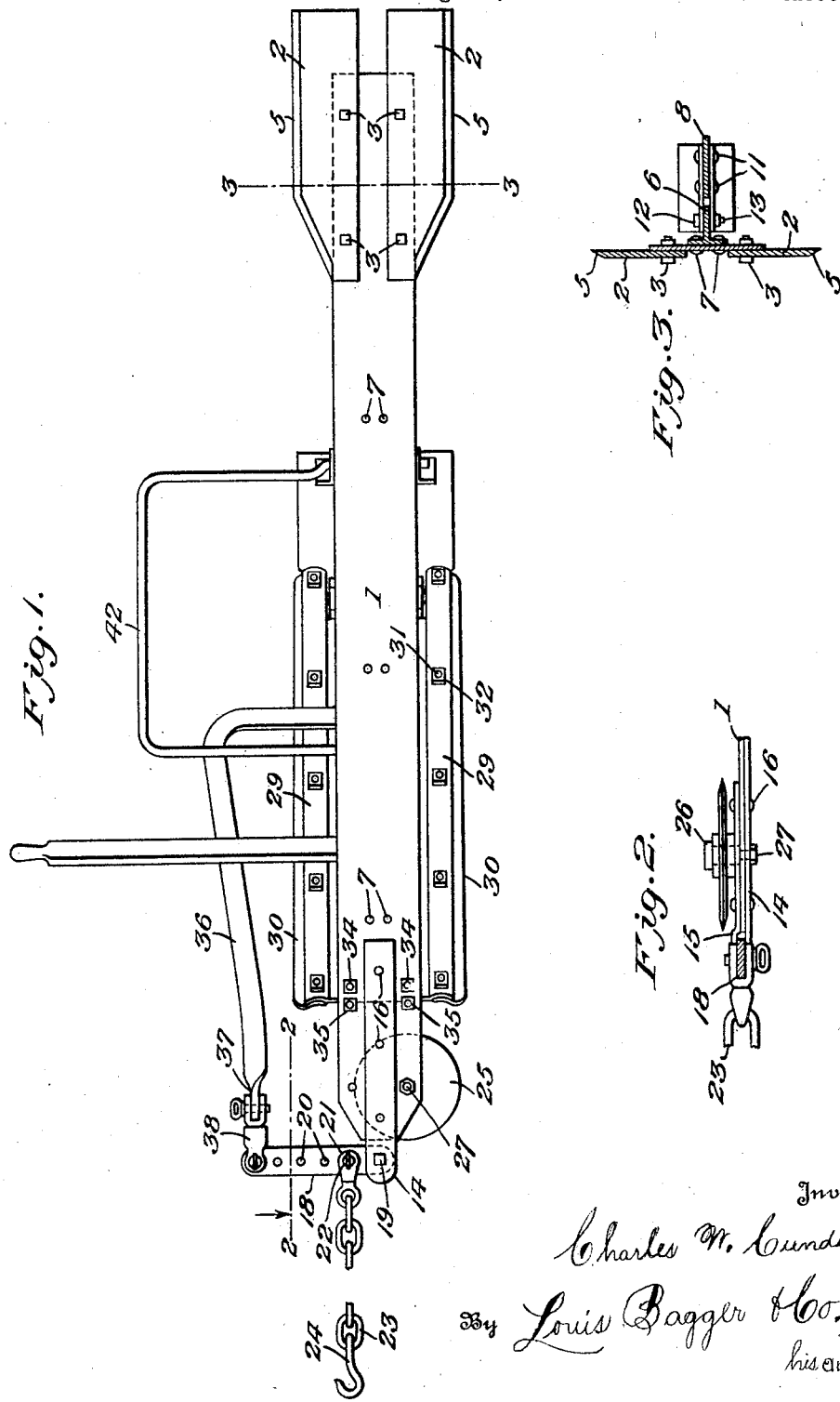

March 6, 1928.
C. W. CUNDIFF
1,661,927
DITCHING AND GRADING MACHINERY
Filed Aug. 31, 1923
2 Sheets-Sheet 2
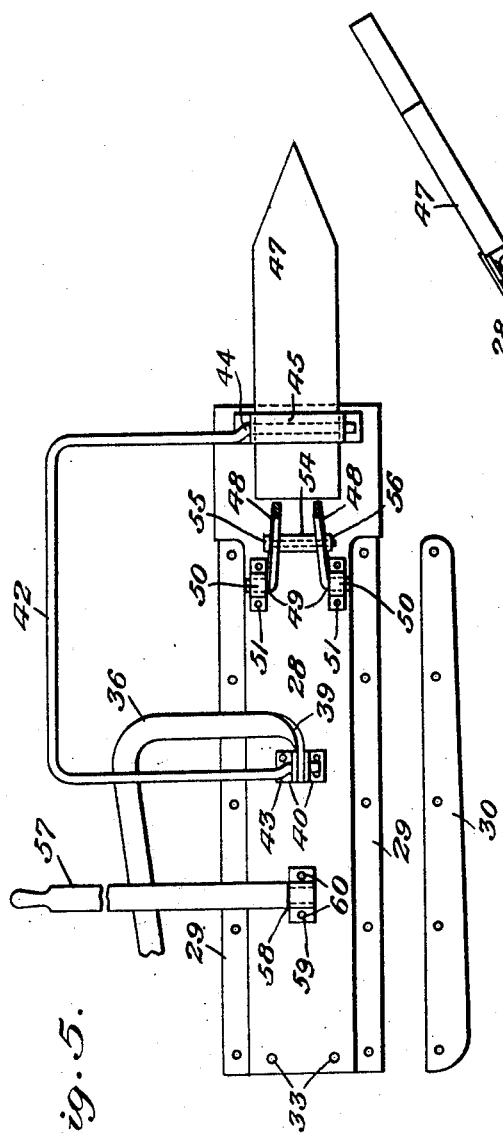
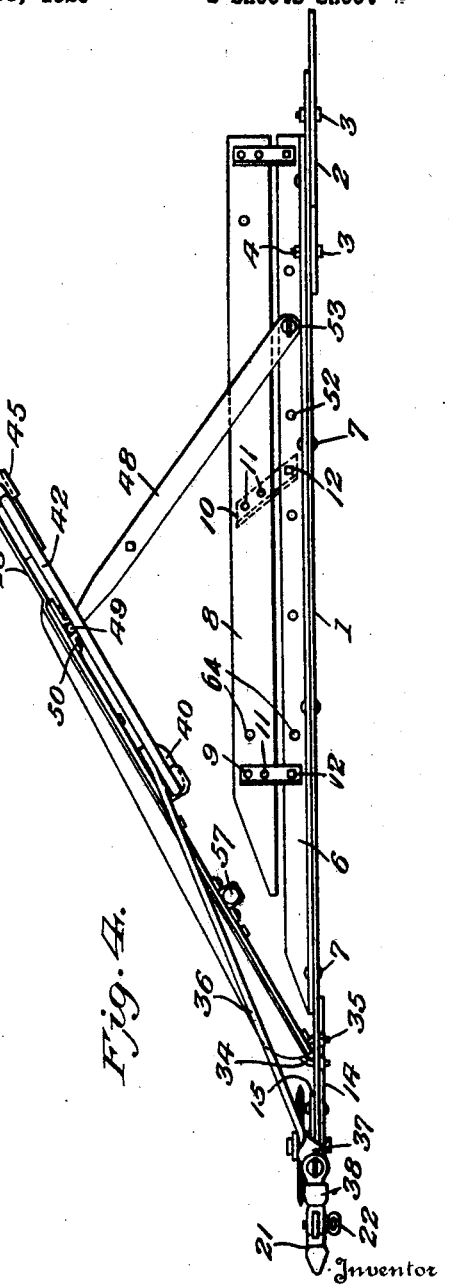

Patented Mar. 6, 1928.

1,661,927

UNITED STATES PATENT OFFICE.

CHARLES W. CUNDIFF, OF OWENSBORO, KENTUCKY, ASSIGNOR TO OWENSBORO DITCHER & GRADER COMPANY, OF OWENSBORO, KENTUCKY, A CORPORATION OF KENTUCKY.

DITCHING AND GRADING MACHINERY.

Application filed August 31, 1923. Serial No. 660,444.

This invention relates to ditching and grading machinery, and provides a new V type, comprising certain improved features of construction, and particularly detachable cutting blades, whereby same may be readily removed for sharpening when they become dull, or otherwise deranged in any manner whatsoever for replacement with new ones. This is a decided improvement in connection with ditching and grading machines in view of the fact that, when it becomes necessary to remove said blades, the necessity of the purchase of same is thereby eliminated, hence the advantage from an economical standpoint.

The machine embodies the reversible feature so important with this type of ditchers, also being provided with a new form of hitch which produces a more positive control of the draft and the manipulation thereof, as will be presently explained.

Still another advantage of the invention is the fact that, due to its particular form of construction, it is rendered almost indestructible and will withstand considerable use without material depreciation thereof. All parts being readily accessible, they may therefore be easily replaced with new ones. Also the machine is very simple in construction and operation and may be produced at a minimum cost and sold proportionately.

In the accompanying drawings:—

Fig. 1 is a side elevation of the machine complete;

Fig. 2 is a detail plan view of the front portion of the machine, a portion being in section taken on the line 2—2 of Fig. 1;

Fig. 3 is a sectional view taken on line 3—3 of Fig. 1;

Fig. 4 is a plan view of the machine;

Fig. 5 is a side elevation of the moldboard detached showing one of the blades removed.

Referring more particularly to the details of construction of the machine, in the drawings the numeral 1 indicates the landside proper, and connected to the rear end thereof are the guide blades 2 by means of bolts 3 which are retained by nuts 4, and as said blades are provided with sharpened edges 5 they may be readily remove for resharpening.

The landside is reinforced by the T rib 6, which is connected to same by rivets 7.

In order to provide ample space for the operator, a foot-board 8 is provided and connected to the rib 6 by the angle-irons 9 and 10 by means of the rivets 11 and bolts 12 with nuts 13, of course holes of the required size are provided in both rib 6 and strip 8 for same.

Referring to the front portion of the landside, a strap 14 is secured to the outer surface and strap 15 on the inner surface of said landside substantially by rivets 16, a shoulder in strap 15 provides ample space between the front end of the straps for the draft-bar 18, which is connected thereto by the bolt 19 and nut (not shown). Holes 20 are provided in the bar 18 for the reception of a single clevis 21, any one of aforesaid holes may be used for said clevis as may be desired relative to the adjustment of the hitch thereof, thumb-screws 22 are used in connection with the clevises. Chain 23 with hook 24 is also provided.

A rolling coulter 25 is connected to the landside by a shouldered stud 26 and nut 27, and having its entire circumference sharpened.

The main blade or mold board of the machine comprises a body 28, which has depressions 29 to receive cutting-blades 30 by means of the bolts 31 and nuts 32, said blades having sharpened outer edges and concaved as shown, giving the proper form to the main blade when assembled thereon. By the use of said cutting-blades, many advantages (some of which have already been explained) are very important features of this machine.

The blade 28 is provided with holes 33 to receive U shaped members 34 having threaded shanks of a reduced diameter to receive nuts 35, and forming the means of connection of the main blade with the landside.

A draft-beam 36 is employed, the front end being formed as at 37 and having a hole to receive the thumb-screw of double clevis 38 which is connected to the draft bar 18 by a thumb-screw, while the opposite end is formed as at 39 and secured to the main blade by brackets 40.

The numeral 42 indicates a hand-rail, the front end having shoulder 43 as shown, and extending through holes in brackets 40 and portion 39 of beam 36, as clearly shown in Fig. 5. The opposite end of said hand-rail is provided with a shoulder 44, the end of the hand-rail passing through hole in clip 45.

An extension beam 47, preferably of wood, is employed, and is of a size and shape to be received by the clip 45. A hole in beam 47 is provided to receive the end shank of the hand rail 42.

Supporting bars 48 have upturned shanks 49 which are received by clips 50, the latter being secured to main blade by rivets 51, the shanks 49 being permitted to pivot within the clips 50 in order to facilitate the movement of the bars 48 when adjustments are made. The opposite ends of bars 48 have holes which register with holes 52 in the T-bar 6 to receive the thumb-screw 53. A separator tube 54 is retained by bolt 55 and nut 56.

A standard 57 having a shoulder 58 permits the shank of same to rest within the clip 59 which is connected to the main blade 28 by rivets 60.

Holes 64 in strip 8 and rib 6 are provided for applying a seat, which has been omitted from the drawing for the sake of clearness.

The right is herewith reserved to make certain minor changes in the details of construction, but without a departure from the general principle disclosed, provided that it becomes necessary to do so in the practical field of the development of the machine for the market.

I claim:

1. A machine of the character described including a moldboard having a concave depression formed adjacent an edge thereof, said depression beginning and terminating approximately in alignment with the main portion of said moldboard, and a cutting blade having a complementary portion fitted in the concave depression.

2. A machine of the character described including a moldboard having a concave depression formed adjacent an edge thereof, said depression beginning and terminating in alignment with the main portion of said moldboard and being formed in the surface thereof, and a cutting blade having a complementary or similarly curved portion to fit into said depression, and means for securing the cutting blade in position.

In testimony whereof I affix my signature.

CHARLES W. CUNDIFF.